United States Patent [19]
Fricko

[11] 3,929,351
[45] Dec. 30, 1975

[54] COMFORT CLIP FOR A SHOULDER BELT OF A VEHICLE OCCUPANT RESTRAINT BELT SYSTEM

[75] Inventor: John J. Fricko, Harper Woods, Mich.

[73] Assignee: General Motors Corporation, Detroit, Mich.

[22] Filed: Nov. 25, 1974

[21] Appl. No.: 526,455

[52] U.S. Cl.............. 280/150 SB; 24/198; 297/388
[51] Int. Cl.[2].................... B62B 35/00; B60R 21/10
[58] Field of Search......... 280/150 SB; 24/198, 200; 297/388, 389

[56] References Cited
UNITED STATES PATENTS

| | | | |
|---|---|---|---|
| 2,099,199 | 11/1937 | Devendor | 24/198 |
| 2,212,862 | 8/1940 | Hirsh | 24/198 |
| 3,218,686 | 11/1965 | Rubenstine | 24/198 |
| 3,856,351 | 12/1974 | Garvey | 280/150 SB |

Primary Examiner—Robert R. Song
Attorney, Agent, or Firm—Herbert Furman

[57] ABSTRACT

A comfort clip for the shoulder belt of a vehicle occupant restraint belt system is of an integral plastic construction and has a generally S-shaped configuration that defines elongated slots opening outwardly in opposite directions so that opposite edges of the shoulder belt may be inserted to within the slots to position the clip along the shoulder belt. A central web of the clip between these slots and a pair of legs extending from the web in opposite directions define the slots and also give the belt an abruptly curved configuration as it passes through the clip. This configuration positions the clip on the belt so engagement of the clip with a shoulder belt guide prevents an associated shoulder belt retractor from tensioning the shoulder belt across the user. The open end of each slot has a bifurcated configuration that defines two tine portions, one of which is in alignment with the rest of the slot and closed at its outer end, and the other of which is laterally displaced from the rest of the slot and open at its outer end to receive the belt. The clip includes an integral projection associated with each slot and extending inwardly to define the bifurcated configuration thereof, and the trailing edges of the shoulder belt are passed over the inward ends of the projections after insertion into the open tine portions so as to be received within the closed tine portions and the rest of the slots in a manner that retains the clip on the belt. The ends of the clip legs opposite to where they are connected to the web support the integral projections that define the bifurcated ends of the slots.

1 Claim, 4 Drawing Figures

COMFORT CLIP FOR A SHOULDER BELT OF A VEHICLE OCCUPANT RESTRAINT BELT SYSTEM

BACKGROUND OF THE INVENTION

This invention relates to a comfort clip for use on a shoulder belt of a vehicle occupant restraint belt system.

The copending patent application of Garvey, Ser. No. 421,213, filed on Dec. 3, 1973, as well as the copending patent application of Fricko, Ser. No. 439,893, filed Feb. 6, 1974, both of which are assigned to the assignee of the present application, disclose comfort clips for use on shoulder belts of vehicle occupant restraint belt systems. These comfort clips are slidably positioned along associated shoulder belts and held in place by a sufficient clamping force so that engagement of each clip with a guide for its shoulder belt prevents an associated belt retractor from tensioning the belt across the chest of a belted vehicle occupant. The force with which the clips are clamped along the shoulder belts is greater than the winding bias of the shoulder belt retractors so that the retractors cannot pull the belts through the clips as the clips engage the guides and thereby defeat the intended function of the clips. The comfort clip of the former patent application is of a one-piece construction, however, the one of the latter patent application is of a two-piece construction.

SUMMARY OF THE INVENTION

The present invention provides an improved comfort clip for the shoulder belt of a vehicle occupant restraint belt system in which the clip has a unique configuration that retains the clip on the shoulder belt.

One feature of the invention is that the improved comfort clip thereof is of an integral plastic construction with a generally S-shaped configuration that defines elongated slots opening outwardly in opposite directions to receive the opposite edges of the shoulder belt as the belt is inserted within the clip, and the open ends of the slots have bifurcated configurations so each defines a closed tine portion in alignment with the rest of the slot and an open tine portion through which the belt is first inserted into the clip prior to having its trailing edge received by the closed tine portion in a manner that retains the clip on the belt. Another feature of the invention is that the clip includes a central belt web between the slots and a pair of legs extending from the web in opposite directions to cooperate therewith in defining the respective slots, and an integral projection on the end of each leg adjacent the open end of the associated slot extends inwardly to define the bifurcated configuration of the adjacent slot end.

BRIEF DESCRIPTION OF THE DRAWINGS:

The above-identified features and other features, objects and advantages of the present invention are readily apparent from the following detailed description of the preferred embodiment and the drawings in which.

DETAILED DESCRIPTION OF THE PREFERRED EMBODIMENT

Figure 1:
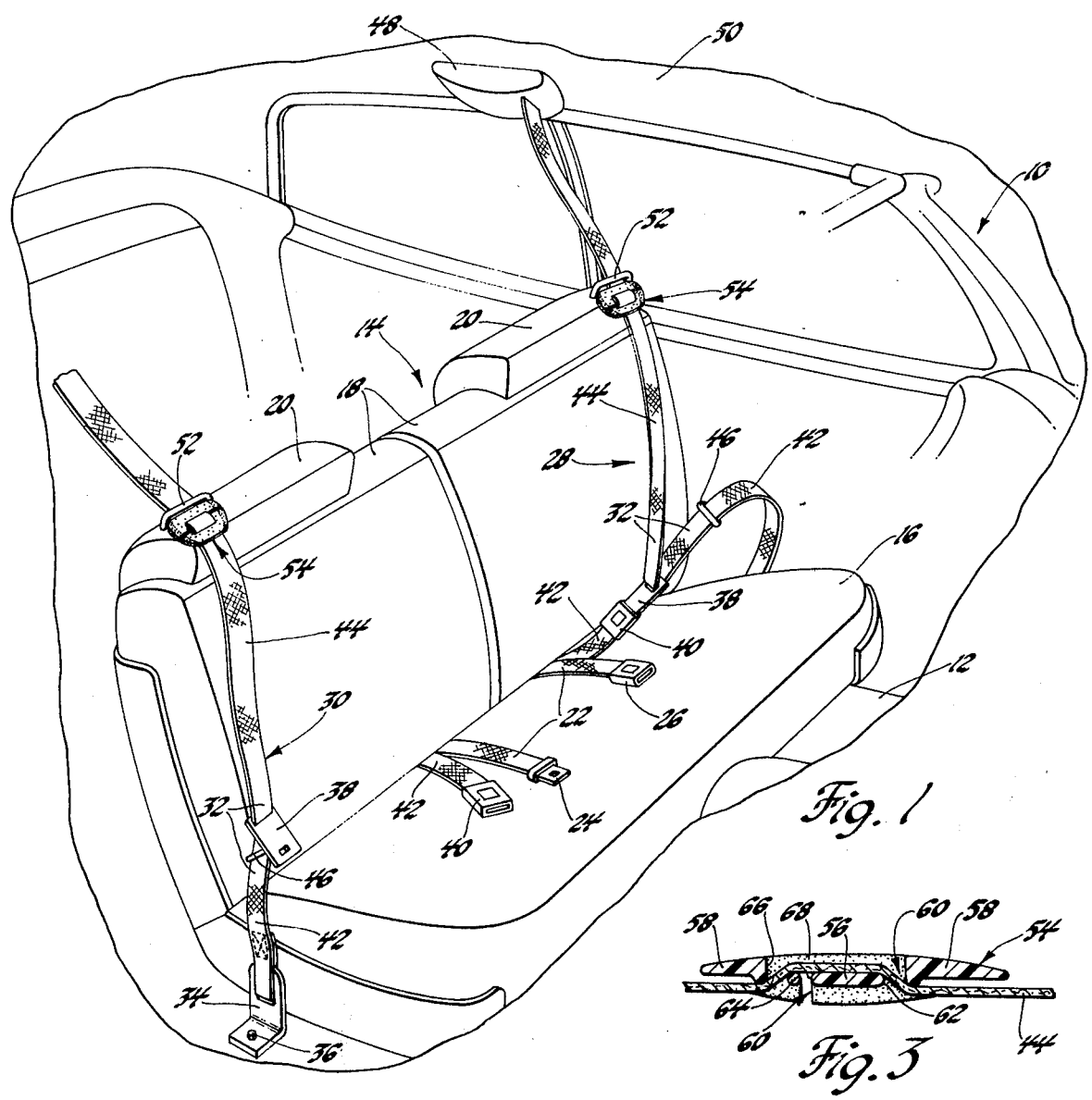
FIG. 1 is a perspective view of the interior of a vehicle whose front seat utilizes a pair of restraint belt systems whose shoulder belts utilize comfort clips according to this invention.

Referring generally to FIG. 1 of the drawings, the interior occupant compartment of an automotive vehicle 10 is shown as including a floor 12 which conventionally mounts a front bench-type seat 14 by way of seat adjusters that are not shown. Seat 14 includes a conventional seat cushion 16 and a pair of seat backs 18. The upper ends of seat backs 18 support headrests 20 for the driver and the outboard seat passenger. A center passenger of the seat utilizes two lap belt portions 22 whose free ends respectively attach a male D-ring 24 and a female buckle 26. The D-ring 24 is selectively attached to and detached from the buckle 26 so as to selectively secure the lap belt portions 22 about the center seat passenger in a restraining manner.

A pair of restraint belt systems for the driver and the outboard front seat passenger are respectively indicated by 28 and 30. The restraint belt system 28 for the driver is shown positioned in an occupant restraining position while the restraint belt system 30 for the passenger is shown in a storage position. These two belt systems are, however, identical to each other except for being symmetrical about the center of the vehicle and will be described using like numerals for like components of each of the systems.

Each belt system 28 and 30 includes a single length of belt 32 with a lower end looped through an attachment plate 34, only one shown, that is secured to the floor 12 by a bolt 36. An intermediate portion of each belt 32 is slidable through an associated D-ring 38 that is selectively attached to an associated female buckle 40 on the end of a short length of belt 42. As shown by the driver belt system 28, attachment of the D-ring 38 and the buckle 40 secures the belt system in an occupant restraining position with the belt 32 defining a lap belt 42 and a shoulder belt 44. A stop 46 positioned along the lap belt 42 limits the downward sliding movement of D-ring 38 when the belt system is in its storage position.

The D-ring 38 may also be of the type presently used on current production vehicles. This type of D-ring includes a clamping surface and a lock bar slidably mounted adjacent the clamping surface. The portion of the belt that engages the belt user passes around the lock bar and then between the clamping surface and the lock bar. When in use, the tension of the belt portion that engages the occupant pulls the lock bar toward the clamping surface to clamp the belt between the lock bar and the clamping surface. The free end of the belt may be pulled to slide the belt through the D-ring and decrease the effective length of the belt without this clamping action. The effective length of the belt may be increased by detaching the D-ring and grasping the portion of the belt that engages the occupant prior to pulling in a direction that does not cause the clamping action. If such a D-ring were used, the shoulder belt portion would be provided extending the free end of the belt and having it received by a suitable belt retractor. Also, the positions of the male D-ring 38 and the buckle 40 may be reversed and still have the belt system function.

The upper end of each shoulder belt 44 is received by an associated shoulder belt retractor 48 mounted on the adjacent outboard edge of the roof 50 above and to the rear of seat 14 at the adjacent outboard end of the seat. These retractors include belt reels that are spring biased so as to normally wind the shoulder belts in a manner that normally stores the belt systems. The shoulder belt retractors 48 permit withdrawal of the shoulder belts 44 upon a manual effort applied to the shoulder belts so as to allow use of the belt systems. This manual effort must be applied to the shoulder belts to overcome the winding spring bias of the associated belt reels of the retractors. Preferably, the shoulder belt retractors 48 are of the type which lock in response to abrupt acceleration or deceleration of the vehicle in any horizontal direction to then limit belt pull-out so the belt systems will restrain the occupants. The shoulder belt retractors may also be of the type in which this belt locking is responsive to abrupt pull-out of the shoulder belts. Both of these types of retractors are well known in the prior art and are thus not being herein described in detail. Nevertheless, regardless of which type of inertia retractor is used, the shoulder belt retractors 48 have a tendency to pull the shoulder belts upwardly and rearwardly across the user's chest.

Each shoulder belt 44 is slidably received by a belt guide 52 mounted on the headrest 20 of the seat back 18 associated with the belt system. The shoulder belts 44 slide freely in both directions through guides 52 and are thus readily moved against the pull of retractors 48 to the restraining position shown by belt system 28. The shoulder belts are thus also readily retracted to a storage condition so as to permit storage of the belt systems as shown by belt system 30. The belt systems are moved into their storage positions only after detachment of the D-rings 38 from their associated buckles 40. In this storage condition, as shown by belt system 30, the single length of belt 32 of the system extends generally vertically between the floor attachment plate 34 and the guide 52 and generally rearwardly and upwardly from the guide 52 to the shoulder belt retractor 48.

Figures 2, 3, 4:
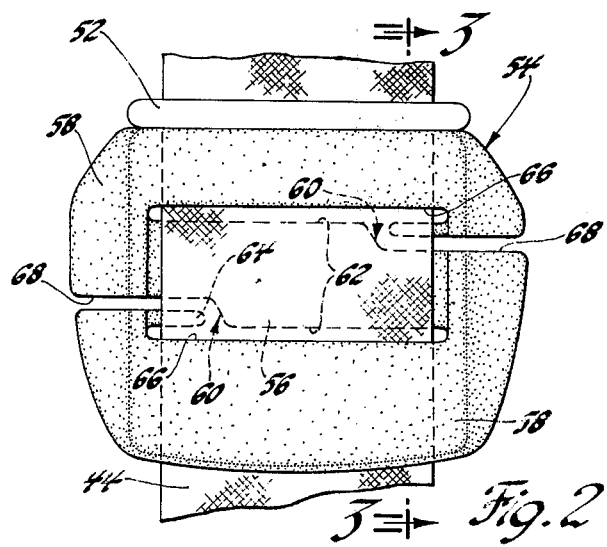
FIG. 2 is an enlarged portion of FIG. 1 showing one of the comfort clips positioned along its associated shoulder belt.
FIG. 3 is a sectional view taken generally along line 3—3 of FIG. 2 and shows the manner in which the shoulder belt extends through the comfort clip in an abruptly curved configuration.
FIG. 4 is a view of the comfort clip that is similar to FIG. 2 but has the shoulder belt removed to more clearly show the clip configuration.

A shoulder belt comfort clip generally indicated by 54 is positioned along each shoulder belt 44 of both belt systems 28 and 30. Additional reference to FIGS. 2 through 4 illustrate comfort clip 54 and the manner in which the clip is positioned along its associated shoulder belt 44. The comfort clip 54 is of an integral plastic construction and has a generally S-shaped configuration as best seen in FIG. 4. Preferably, the comfort clip is made from a clear plastic so it is not necessary to color code the clips to the particular interior color of the vehicle on which they are used. The central portion of the comfort clip 54 includes a belt web 56 which is elongated in a direction that is transverse with respect to the elongated direction of the shoulder belt 44 when the clip is mounted on this belt. Each end of the web 56 is integrally connected to an associated leg 58 of the clip, and these legs extend in opposite directions with respect to each other alongside opposite sides of the web 56 so as to cooperate with the web in defining a pair of slots 60. These slots 60 open in opposite directions with respect to each other, and permit the opposite side edges of the shoulder belt 44 to be inserted within the clip so that the clip may be mounted on the shoulder belt intermediate the ends of the belt. When so mounted, the clip slots 60 extend transversely with respect to the elongated direction of the shoulder belt so as to open sideways with respect to the belt.

The slots 60 of the comfort clip 54 have elongated portions 62 extending between their closed ends toward their open ends. At the open ends of the slots 60, the clip legs 58 include integral projections 64 that extend inwardly so the open slot ends have bifurcated configurations. These bifurcated configurations include a closed tine portion 66 that is aligned with the elongated portion 62 of the associated slot as well as an open tine portion 68 through which the belt is inserted. Each open tine portion 68 is laterally displaced from the elongated portion 62 of the associated slot so these two slot portions are not in alignment with each other. After insertion of the leading side edges of the belt to within these slots through the open tine portions 68, the trailing side edges of the belt are then passed around the inward ends of projections 64 so as to be received within the closed tine portions 66. This causes the belt to thus be threaded through the clip in the manner shown in FIG. 3 so that it extends in through one slot 60, over the belt web 56 in an abruptly curved configuration, and then out through the other slot 60. The abruptly curved configuration of the shoulder belt 44 is achieved by having the belt web 56 and legs 58 located in a common plane, and this configuration generates a frictional force between the clip and the belt that positions the clip along the belt. This frictional force is greater than the winding bias of the associated shoulder belt retractor 48. Proper positioning of the clip thus permits the clip to engage the shoulder belt guide 52 so the winding bias of the associated shoulder belt retractor will not pull the belt through the clip as the clip engages the guide during use of the belt system. Rather, the engagement of the clip with the shoulder belt guide 52 relieves the belt user of the winding bias of the shoulder belt retractor. Having the opposite side edges of shoulder belt located within the closed tine portions 66 of the respective slots ensures that the clip will be retained on the belt to provide this function.

The comfort clip 54 may be adjusted along its associated shoulder belt in either direction to accomodate occupants of different sizes. To be properly adjusted, the shoulder belt 44 should have just a slight amount of slack so as to permit the occupant to insert his fist between his chest and the belt without causing the comfort clip 54 to disengage the guide 52. This adjustment is accomplished by manually pushing the portion of the belt 44 on the appropriate side of the clip through the adjacent slot 60 to form a belt loop between the two slots. The belt portion on the opposite side of the clip is then pulled to flatten this loop to the position shown by FIG. 3 so that the clip is then again ready for use. It should be noted that the belt web 56 and the integral projections 64 of legs 58 are slightly recessed from the upper side of the clip so the belt forms a smooth surface with the top of the clip.

The invention thus provides an improved comfort clip for a vehicle occupant restraint belt system.

What is claimed is:

1. In a vehicle occupant restraint belt system including lap and shoulder belts having a predetermined width between side edges thereof, a buckle assembly for securing the lap and shoulder belts across a seated vehicle occupant, a shoulder belt guide slidably receiving and thereby guiding the shoulder belt over the shoulder of the seated occupant, and a shoulder belt retractor receiving the shoulder belt so as to normally pull the shoulder belt back through the guide for storage but permitting withdrawal thereof for use, a comfort clip for the shoulder belt comprising:

an integral plastic clip of a generally S-shaped configuration that defines elongated slots opening outwardly in opposite directions, the clip including a central belt web between the slots and a pair of legs extending from the belt web in opposite directions to cooperate therewith in defining the slots, the clip web and legs being located in the same plane so that the shoulder belt takes an abruptly curved configuration upon being passed through the slots and over the web, this abruptly curved configuration of the belt generating a frictional force that positions the clip along the shoulder belt during use so that the clip engages the guide to prevent the retractor from tensioning the shoulder belt across the occupant, the slots each having a bifurcated configuration adjacent the open end thereof so as to define two tine portions, one tine portion of each slot being in alignment with the rest of the slot and being closed at its outer end, the other tine portion of each slot being laterally displaced from the rest of the slot and opening outwardly to permit the shoulder belt to be received by the clip intermediate ends of this belt by inserting opposite edges thereof into the slots, the clip leg adjacent each slot including an integral projection that extends inwardly at the open end of the associated slot between the tine portions thereof so as to terminate at an inward end in a manner that defines the bifurcated configuration of the open end of the slot, and the opposite edges of the belt being passed over the inward ends of the respective projections after insertion into the laterally displaced open tine portions of the slots so as to be received within the closed tine portions and the rest of the slots in a manner that retains the clip on the belt, the clip web and the integral projections thereof being recessed from at least one outer side of the comfort clip to recess the abruptly curved configuration portion of the belt within the confines of the comfort clip.

\* \* \* \* \*